United States Patent [19]

Watanabe et al.

[11] Patent Number: 5,519,070
[45] Date of Patent: May 21, 1996

[54] SOFT OCULAR LENS MATERIAL

[75] Inventors: Tsuyoshi Watanabe; Ichiro Ando, both of Nagoya; Shoji Ichinohe; Toshio Yamazaki, both of Gunma, all of Japan

[73] Assignees: Menicon Co., Ltd., Nagoya; Shin-Etsu Chemical Co., Ltd., Tokyo, both of Japan

[21] Appl. No.: 350,025

[22] Filed: Nov. 29, 1994

[30] Foreign Application Priority Data

Dec. 10, 1993 [JP] Japan ..................... 5-310455

[51] Int. Cl.$^6$ .......... C08F 18/20; C08F 230/08; C08F 283/00
[52] U.S. Cl. .......... 523/107; 526/245; 526/279; 526/301; 528/32
[58] Field of Search .......... 523/107; 526/245, 526/279, 301; 528/32

[56] References Cited

U.S. PATENT DOCUMENTS

| | | | |
|---|---|---|---|
| 4,605,712 | 8/1986 | Mueller et al. | 528/24 |
| 4,837,289 | 6/1989 | Mueller et al. | 526/279 |
| 4,954,586 | 9/1990 | Toyoshima et al. | 523/107 |
| 5,310,779 | 5/1994 | Lai | 526/301 |

*Primary Examiner*—Paul R. Michl
*Assistant Examiner*—Andrew E. C. Merriam
*Attorney, Agent, or Firm*—Oblon, Spivak, McClelland, Maier, & Neustadt

[57] ABSTRACT

A soft ocular lens material prepared by copolymerizing copolymer components consisting essentially of:

(A) from 5 to 70 parts by weight of a fluorine-containing (meth)acrylate;

(B) from 5 to 60 parts by weight of an alkoxy-containing (meth)acrylate;

(C) from 3 to 45 parts by weight of a polysiloxane macromonomer having polymerizable groups at both terminals, of the formula I:

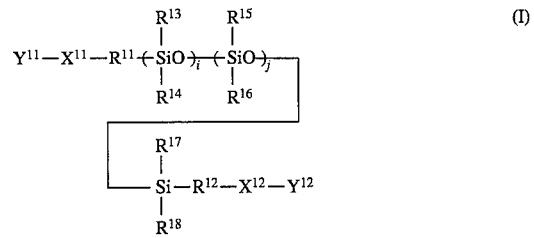

(D) from 3 to 40 parts by weight of a polysiloxane macromonomer having polymerizable groups bonded via one or two urethane bonds to the siloxane main chain, of the formula II:

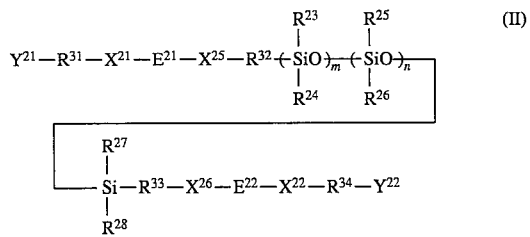

19 Claims, No Drawings

SOFT OCULAR LENS MATERIAL

The present invention relates to a soft ocular lens material. More particularly, the present invention relates to a soft ocular lens material useful for contact lenses, intraocular lenses or artificial cornea.

Various ocular lens materials have been proposed as contact lens materials or intraocular lens materials. Such ocular lens materials are generally classified into soft materials and hard materials. It is generally well known that soft materials are preferred as materials for contact lenses giving comfortable feeling to wearers, or as materials for intraocular lenses which can be readily inserted in a deformed shape through a small incision of the eye ball without damaging eye tissues.

Soft materials are classified into water-absorptive materials which swell and soften upon absorption of water, and substantially non-water absorptive materials.

The water absorptive materials have a drawback that they are inferior in the mechanical strength since upon absorption of water, the proportion of the material itself is relatively small. Further, upon absorption of water, bacteria or fungi are likely to propagate in the materials. Therefore, when they are used as contact lenses, it will be required to periodically repeat a rather cumbersome operation such as boiling for sterilization.

As the substantially non-water absorptive materials, a silicone rubber material and a (meth)acrylate soft material may, for example, be mentioned.

The silicone rubber material has a merit that it has very high oxygen permeability. However, the surface of the obtained material has extremely strong water repellency and exhibits poor affinity to the cornea or other ocular tissues. It has been reported that some of the products prepared by using this material as a material for contact lenses, have induced serious troubles to the ocular tissues.

Japanese Unexamined Patent Publications No. 102914/1984 and No. 297411/1988 propose as a contact lens material a polymer composed of a cross-linked polymer product of a polysiloxane macromonomer having polymerizable groups bonded via e.g. urethane bonds to a polysiloxane, with a hydrophilic monomer. Such a material has strength improved to some extent, but when the amount of the polysiloxane is small, it is difficult to obtain a product having adequate oxygen permeability, and if it is attempted to use a polysiloxane having a longer siloxane chain to increase the oxygen permeability, the compatibility with other copolymer components tends to be poor, and it becomes difficult to obtain a material which is uniform and transparent and which has satisfactory mechanical strength. Further, if the polysiloxane is used in a large amount, the product tends to be easily stained with e.g. lipids. An attempt to copolymerize a fluorine monomer to provide resistance against such lipid stains does not work because of poor compatibility of the above polysiloxane with the fluorine monomer, whereby it is difficult to obtain a uniform and transparent polymer, and such a polymer will be poor in the mechanical strength, and its oxygen permeability will not be sufficiently high.

Further, Japanese Unexamined Patent Publication No. 229524/1984 proposes as a contact lens material a reaction product of a composition comprising an organopolysiloxane urethane acrylate and an ethylenically unsaturated comonomer. However, the contact lens material made of such a reaction product still has the same drawbacks as the contact lens material disclosed in the above-mentioned Japanese Unexamined Patent Publication No. 102914/1984.

In addition to the above-mentioned publications, for example, Japanese Examined Patent Publication No. 28329/1985 proposes to use as a contact lens material a polysiloxane obtained by polymerizing an organosiloxane monomer with a comonomer. The material in which such a polysiloxane is employed, has good oxygen permeability, but does not have adequate mechanical strength and is brittle as its drawback.

Among the above-mentioned (meth)acrylate soft materials, those using a copolymer composed essentially of butyl acrylate, as the base material, are practically used for contact lenses. However, the contact lenses made of such material have a tacky surface, and lipid stains are likely to adhere thereon, whereby the lenses are likely to have white turbidity. Further, the oxygen permeability is not so high, and the mechanical strength is not fully satisfactory. Thus, they have a number of properties which are still to be improved.

With respect to the (meth)acrylate soft materials, in addition to those mentioned above, there has been proposed a non-water absorptive soft contact lens made of a copolymer prepared by using an acrylate, a methacrylate and a cross-linkable monomer having a cyclic structure in its molecule and at least two functional groups, wherein the number of atoms present between the cyclic structure and the functional groups is at least 2 (Japanese Unexamined Patent Publication No. 127812/1987). Such a non-water absorptive soft contact lens has improved mechanical strength and flexibility, but it is susceptible to lipid stains, and the oxygen permeability is not adequate for a contact lens capable of being continuously worn.

Further, other than the above, a non-water absorptive soft contact lens made of a copolymer of a fluorine-containing methacrylate, a (meth)acrylate and a cross-linkable monomer other than those mentioned above, has been disclosed (Japanese Unexamined Patent Publication No. 127824/1987), and a non-water absorptive oxygen permeable soft contact lens obtained by esterification treatment, with a fluorine-containing alcohol, of a hard copolymer obtained by copolymerizing a monomer mixture containing acrylic acid and/or methacrylic acid and a cross-linkable monomer, has been proposed (Japanese Unexamined Patent Publication No. 127825/1987). The contact lenses disclosed in these publications each has the mechanical strength improved to some extent, and the oxygen permeability is good to some extent. However, they have a drawback that when the cross-linkable monomer is used in a larger amount to improve the mechanical strength, the oxygen permeability tends to be low, the flexibility tends to be poor, and the material tends to be brittle.

In view of such conventional techniques, the present inventors have conducted extensive researches to obtain a soft ocular lens material which (1) has excellent transparency, (2) exhibits substantially no water absorptivity or low water absorptivity, (3) is resistant against lipid stains, (4) is excellent in the oxygen permeability, and (5) has practically adequate mechanical strength. As a result, they found an ocular lens material satisfying all of such physical properties. They previously filed patent applications (Japanese Unexamined Patent Publications No. 188717/1990, No. 213820/1990 and No. 43711/1991).

However, such a soft ocular lens material sometimes had tackiness to some extent on its surface. When the surface of an ocular lens is tacky, such an ocular lens is likely to adhere to living tissues of e.g. cornea, whereby the ocular tissues are likely to be damaged, and it becomes difficult to handle such an ocular lens, or foreign matters tend to adhere on its surface. Therefore, it is desired to minimize such surface tackiness of an ocular lens.

Further, the present inventors have previously proposed a soft ocular lens material having the surface tackiness eliminated by applying alkali treatment to the above-mentioned soft ocular lens material (Japanese Unexamined Patent Publication No. 228014/1991). Such a soft ocular lens has its surface tackiness sufficiently reduced, but such an effect has been inadequate for the continuous use for a long period of time.

In view of such a problem of the prior art, the present inventors have conducted extensive researches and as a result, have found a soft ocular lens material having tackiness substantially further reduced. The present invention has been accomplished on the basis of this discovery.

In the present specification, substantially no water absorptivity or low water absorptivity means that the water absorptivity of the material is not higher than 5%.

The present invention provides a soft ocular lens material prepared by copolymerizing copolymer components consisting essentially of:

(A) from 5 to 70 parts by weight of a fluorine-containing (meth)acrylate;

(B) from 5 to 60 parts by weight of an alkoxy-containing (meth)acrylate;

(C) from 3 to 45 parts by weight of a polysiloxane macromonomer having polymerizable groups at both terminals, of the formula I:

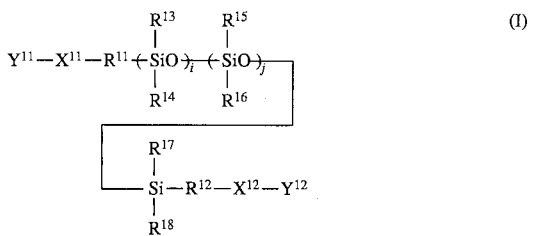

wherein each of $Y^{11}$ and $Y^{12}$ independently represents an acryloyl group, a methacryloyl group, a vinyl group or an allyl group; each of $X^{11}$ and $X^{12}$ independently represents a covalent bond, an oxygen atom or an alkylene glycol group; each of $R^{11}$ and $R^{12}$ independently represents a linear or branched alkylene group having from 1 to 6 carbon atoms; each of $R^{13}$, $R^{14}$, $R^{15}$, $R^{16}$, $R^{17}$ and $R^{18}$ independently represents an alkyl group having from 1 to 3 carbon atoms or a phenyl group; i is an integer of from 1 to 1500; and j is an integer of from 0 to 1500–i; and (D) from 3 to 40 parts by weight of a polysiloxane macromonomer having polymerizable groups bonded via one or two urethane bonds to the siloxane main chain, of the formula II:

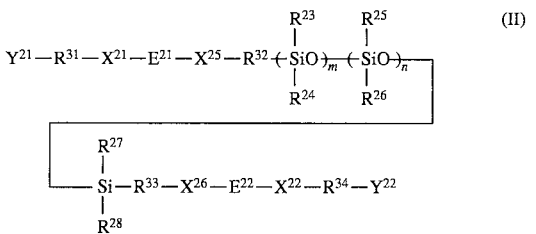

wherein each of $Y^{21}$ and $Y^{22}$ independently represents a group selected from the group consisting of an acryloyloxy group, a methacryloyloxy group, a vinyl group and an allyl group; each of $R^{31}$ and $R^{34}$ independently represents a linear or branched alkylene group having from 2 to 6 carbon atoms; each of $X^{21}$ and $X^{22}$ independently represents a covalent bond, an oxygen atom or an alkylene glycol group; each of $R^{32}$ and $R^{33}$ independently represents a linear or branched alkylene group having from 1 to 6 carbon atoms; each of $R^{23}$, $R^{24}$, $R^{25}$, $R^{26}$, $R^{27}$ $R^{28}$ independently represents an alkyl group having from 1 to 3 carbon atoms or a phenyl group; each of $E^{21}$ and $E^{22}$ independently represents —NHCO— (provided that in this case, each of $X^{21}$ and $X^{22}$ is a covalent bond, $E^{21}$ forms a urethane bond together with $X^{25}$, and $E^{22}$ forms a urethane bond together with $X^{26}$) or a bivalent group derived from a diisocyanate selected from the group consisting of saturated aliphatic, alicyclic and aromatic diisocyanates (provided that in this case, each of $X^{21}$ and $X^{22}$ independently represents an oxygen atom or an alkylene glycol group, $E^{21}$ forms a urethane bond together with $X^{21}$ and $X^{25}$, and $E^{22}$ forms a urethane bond together with $X^{22}$ and $X^{26}$); each of $X^{25}$ and $X^{26}$ independently represents an oxygen atom, an alkylene glycol group or a group represented by the formula III:

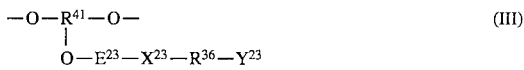

wherein $R^{41}$ is a trivalent hydrocarbon group having from 1 to 6 carbon atoms; $Y^{23}$ represents a group selected from the group consisting of an acryloyloxy group, a methacryloyloxy group, a vinyl group and an allyl group; $R^{36}$ represents a linear or branched alkylene group having from 2 to 6 carbon atoms; $X^{23}$ represents a covalent bond, an oxygen atom or an alkylene glycol group; $E^{23}$ represents —NHCO— (provided that in this case, $X^{23}$ is a covalent bond) or a bivalent group derived from a diisocyanate selected from the group consisting of saturated aliphatic, alicyclic and aromatic diisocyanates (provided that in this case, $X^{23}$ is an oxygen atom or an alkylene glycol group), which forms a urethane bond together with $X^{23}$ and the adjacent oxygen atom bonded to $R^{41}$; m is an integer of from 1 to 1500; and n is an integer of from 0 to 1500–m.

Now, the present invention will be described in detail with reference to the preferred embodiments.

As mentioned above, the soft ocular lens material of the present invention is the one prepared by copolymerizing copolymer components consisting essentially of (A) a fluorine-containing (meth)acrylate (hereinafter referred to as monomer (A)), (B) an alkoxy-containing (meth)acrylate (hereinafter referred to as monomer (B)), (C) a polysiloxane macromonomer of the formula I as define above (hereinafter referred to as macromonomer (C)) and (D) a polysiloxane macromonomer of the formula II as defined above (hereinafter referred to as macromonomer (D)).

The above monomer (A) is a component which provides a function of stain resistance against e.g. lipid stains without reducing the oxygen permeability of the soft ocular lens material. As a typical example of such monomer (A), a monomer represented by the formula IV:

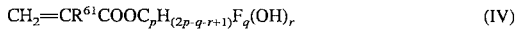

wherein $R^{61}$ represents a hydrogen atom or a methyl group, p is an integer of from 1 to 15, q is an integer of from 1 to (2p+1), and r is an integer of from 0 to 2, may, for example, be mentioned. Specific examples of such a monomer include 2,2,2-trifluoroethyl(meth)acrylate, 2,2,3,3-tetrafluoropropyl(meth)acrylate, 2,2,3,3-tetrafluoro-t-pentyl(meth)acrylate, 2,2,3,4,4,4-hexafluorobutyl(meth)acrylate, 2,2,3,4,4,4-hexafluoro-t-hexyl(meth)acrylate, 2,3,4,5,5,5-hexafluoro-2, 4-bis(trifluoromethyl)pentyl(meth)acrylate, 2,2,3,3,4,4-hexafluorobutyl(meth)acrylate, 2,2,2,2',2',2'-hexafluoroisopropyl(meth)acrylate, 2,2,3,3,4,4,4-heptafluorobutyl(meth)acrylate, 2,2,3,3,4,4,5,5- octafluoropentyl(meth)acrylate, 2,2,3,3,4,4,5,5,5-nonafluoropentyl(meth)acrylate, 2,2,3,3,4,4,5,5,6,6,7,7-dodecafluoroheptyl(meth)acrylate, 3,3,4,4,5,5,6,6,7,7,8,8-dodecafluorooctyl(meth)acrylate, 3,3,4,4,5,5,6,6,7,7,8,8,8-tridecafluorooctyl(meth)acrylate, 2,2,3,3,4,4,5,5,6,6,7,7,7-tridecafluoroheptyl(meth)acrylate, 3,3,4,4,5,5,6,6,7,7,8,8,9,9,10,10-hexadecafluorodecyl(meth)acrylate, 3,3,4,4,5,5,6,6,7,7,8,8,9,9,10,10,10-heptadecafluorodecyl(meth)acrylate, 3,3,4,4,5,5,6,6,7,7,8,8,9,9,10,10,11,11-octadecafluoroundecyl(meth)acrylate, 3,3,4,4,5,5,6,6,7,7,8,8,9,9,10,10,11,11,11-nonadecafluoroundecyl(meth)acrylate, 3,3,4,4,5,5,6,6,7,7,8,8,9,9,10,10,11,11,12,12-eicosafluorododecyl(meth)acrylate, 2-hydroxy-4,4,5,5,6,7,7,7-octafluoro-6-trifluoromethylheptyl(meth)acrylate, 2-hydroxy-4,4,5,5,6,6,7,7,8,9,9,9-dodecafluoro-8-trifluoromethylnonyl(meth)acrylate and 2-hydroxy-4,4,5,5,6,6,7,7,8,9,9,10,11,11,11-hexadecafluoro-10-trifluoromethylundecyl(meth)acrylate.

The above monomer (A) is incorporated in an amount of from 5 to 70 parts by weight, preferably from 10 to 60 parts by weight, more preferably from 25 to 55 parts by weight, most preferably from 30 to 50 parts by weight, per 100 parts by weight of the total amount of the copolymer components. If the amount of the monomer (A) is less than the lower limit of the above range, no adequate effect by the incorporation of the monomer (A) will be obtained, and the resulting lens material tends to be susceptible to stains such as lipid stains. Not only that, the mechanical strength tends to be low. On the other hand, if the amount exceeds the above upper limit, the amounts of other copolymer components (monomer (B) and macromonomers (C) and (D)) will be relatively small, whereby the resulting soft ocular lens material tends to be poor in the flexibility, the elongation tends to be small, and the material tends to be brittle. Further, in such a case, the oxygen permeability of the resulting soft ocular lens material tends to be inadequate, and the compatibility of the monomer (A) with other copolymer components, tends to be poor, whereby it becomes difficult to obtain a soft ocular lens material which is uniform and transparent, and which has satisfactory mechanical strength.

The above-mentioned monomer (B) is a component which not only imparts proper flexibility to the soft ocular lens material but also has a function to impart hydrophilicity and to reduce tackiness. Typical examples of such a monomer (B) include a monomer of the formula (V):

$$CH_2=CR^{51}COO(CH_2)_vOR^{52} \quad (V)$$

wherein $R^{51}$ is a hydrogen atom or a methyl group, $R^{52}$ is a hydrocarbon group having from 1 to 12 carbon atoms, and v is an integer of from 1 to 12, and a monomer of the formula (VI):

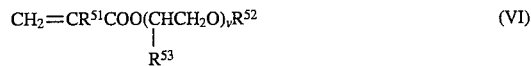

$$CH_2=CR^{51}COO(CHCH_2O)_vR^{52}$$
$$\quad\quad\quad\quad\quad\quad | \quad\quad\quad\quad\quad (VI)$$
$$\quad\quad\quad\quad\quad\quad R^{53}$$

wherein $R^{51}$, $R^{52}$ and v are as defined above, and $R^{53}$ is a hydrogen atom or a methyl group. Specific examples of such a monomer include linear or branched alkoxy group-containing (meth)acrylates such as methoxyethyl(meth)acrylate, ethoxyethyl(meth)acrylate, butoxyethyl(meth)acrylate, methoxypropyl(meth)acrylate, methoxybutyl(meth)acrylate, methoxydiethylene glycol(meth)acrylate, and ethoxydiethylene glycol(meth)acrylate. Among these monomers, one or more are selected for use.

Among the above monomers (B), an alkoxy-containing (meth)acrylate, of which the glass transition temperature (hereinafter referred to as Tg) of a homopolymer would be not higher than 40° C., is particularly preferably used in the present invention, since it has a merit such that the flexibility of the soft ocular lens material thereby obtained can properly be adjusted. Here, the molecular weight of the homopolymer is preferably at least about 10,000. Because if the molecular weight of the homopolymer is at least 10,000, Tg of such a homopolymer does not depend on such a molecular weight and does not substantially change.

The above monomer (B) is incorporated in an amount of from 5 to 60 parts by weight, preferably from 10 to 55 parts by weight, more preferably from 20 to 50 parts by weight, most preferably from 25 to 35 parts by weight, relative to 100 parts by weight of the total amount of the copolymer components. If the amount of such a monomer (B) is less than the above lower limit, no adequate effect by the incorporation of the monomer (B) will be obtained, and the flexibility of the resulting material tends to be low. On the other hand, if the amount exceeds the above upper limit, the amounts of other copolymer components will correspondingly be small, whereby the effects of incorporating such other copolymer components tend to be inadequate, and the water content of the resulting soft ocular lens material tends to be high and the material tends to be not substantially non-water absorptive or low water absorptive.

The macromonomer (C) is a component which imparts excellent oxygen permeability to the soft ocular lens material and has polymerizable groups at both ends of the molecule. Such polymerizable groups are copolymerized with other lens components (copolymer components), whereby there will be no elution of the macromonomer (C) from the resulting soft ocular lens material.

As the macromonomer (C), the one represented by the formula I is used as mentioned above. In the formula I, each of $Y^{11}$ and $Y^{12}$ independently represents an acryloyl group, a methacryloyl group, a vinyl group or an allyl group, as mentioned above. Each of $X^{11}$ and $X^{12}$ independently represents a covalent bond, an oxygen atom or an alkylene glycol group. As such an alkylene glycol group, a group represented by the formula (VII):

$$-O(C_kH_{2k}-O)_l \quad (VII)$$

wherein k is an integer of from 2 to 4, and is an integer of from 1 to 5 may be used. In this formula (VII), if l is an integer of 6 or higher, the oxygen permeability tends to decrease, or the mechanical strength tends to be low. Therefore, in the present invention, l is an integer of from 1 to 5, preferably from 1 to 3. Each of $R^{11}$ and $R^{12}$ independently represents a straight chain or branched chain alkylene group having from 1 to 6 carbon atoms. If such an alkylene group has 7 or more carbon atoms, the oxygen permeability tends to decrease. Particularly preferred carbon number of the alkylene group is from 1 to 3. Each of $R^{13}$, $R^{14}$, $R^{15}$, $R^{16}$, $R^{17}$ and $R^{18}$ independently represents an alkyl group having from 1 to 3 carbon atoms or a phenyl group. i is an integer of from 1 to 1500, and j is an integer of from 0 to 1500–i. However, if i+j exceeds 1500, the molecular weight of the macromonomer (C) tends to be too large, and the compatibility with other copolymer components tends to be poor, and it is likely that it will not adequately dissolve when mixed, white turbidity will form during the polymerization, and it tends to be difficult to obtain a uniform and transparent material. On the other hand, if i+j is too small, not only the oxygen permeability of the resulting material will be low, but also the flexibility tends to be poor. Therefore, i+j is from 1 to 1500, preferably from 3 to 500, more preferably from 5 to 100.

The macromonomer (C) is incorporated in an amount of from 3 to 45 parts by weight, preferably from 5 to 35 parts by weight, more preferably from 5 to 25 parts by weight, most preferably from 10 to 20 parts by weight, relative to 100 parts by weight of the total amount of the copolymer components. If the amount of the macromonomer (C) is less than the above-mentioned lower limit, no adequate effects of using the macromonomer (C) will be obtained, and not only the oxygen permeability of the resulting soft ocular lens material will be inadequate, but the resiliency tends to be inadequate. On the other hand, if the amount exceeds the above-mentioned upper limit, the amounts of other components correspondingly decrease, whereby the resulting soft ocular lens material tends to be poor in elongation and brittle, it will be susceptible to stains such as lipid stains, the compatibility with other copolymer components tends to be poor, and it becomes difficult to obtain a uniform and transparent soft ocular lens material.

The macromonomer (D) has resilient bonds such as urethane bonds and reinforces the soft ocular lens material by the siloxane moiety without impairing the flexibility and the oxygen permeability of the material. It imparts the resiliency (toughness or resilient elasticity) and eliminate brittleness as the soft ocular lens material. Namely, it is a component which improves the mechanical strength.

The macromonomer (D) has polymerizable groups at both terminals of the molecule. By virtue of such polymerizable groups, it is copolymerized with other lens components (copolymer components), whereby it does not elute from the resulting soft ocular lens material. It has excellent properties such that it imparts to the soft ocular lens material not only physical reinforcing effects due to the interlocking of molecules, but also reinforcing effects due to chemical bonding.

As the macromonomer (D), the one represented by the formula II is employed as mentioned above. In the formula II, each of $Y^{21}$ and $Y^{22}$ independently represents a group selected from the group consisting of an acryloyloxy group, a methacryloyloxy group, a vinyl group and an allyl group, as mentioned above. Each of $R^{31}$ and $R^{34}$ independently represents a straight chain or branched chain alkylene group having from 2 to 6 carbon atoms, as mentioned above. Each of $R^{32}$ and $R^{33}$ independently represents a straight chain or branched chain alkylene group having from 1 to 6 carbon atoms, as mentioned above. Each of $R^{23}$, $R^{24}$, $R^{25}$, $R^{26}$, $R^{27}$ and $R^{28}$ represents an alkyl group having from 1 to 3 carbon atoms or a phenyl group, as mentioned above. Each of $E^{21}$ and $E^{22}$ independently represents —NHCO— (provided that in this case, each of $X^{21}$ and $X^{22}$ is a covalent bond, $E^{21}$ forms a urethane bond together with $X^{25}$, and $E^{22}$ forms a urethane bond together with $X^{26}$) or a bivalent group derived from a diisocyanate selected from the group consisting of saturated aliphatic, alicyclic and aromatic diisocyanates (provided that in this case, each of $X^{21}$ and $X^{22}$ independently represents an oxygen atom or an alkylene glycol group, $E^{21}$ forms a urethane bond together with $X^{21}$ and $X^{25}$, and $E^{22}$ and forms a urethane bond together with $X^{22}$ and $X^{26}$). Each of $X^{21}$ and $X^{22}$ independently represents a covalent bond, an oxygen atom or an alkylene glycol group. As such an alkylene glycol group, a group of the above formula VII may, for example, be mentioned.

Each of $X^{25}$ and $X^{26}$ independently represents an oxygen atom, an alkylene glycol group or a group represented by the formula III:

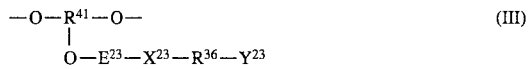
(III)

wherein $R^{41}$ is a trivalent hydrocarbon group having from 1 to 6 carbon atoms; $Y^{23}$ represents a group selected from the group consisting of an acryloyloxy group, a methacryloyloxy group, a vinyl group and an allyl group; $R^{36}$ represents a linear or branched alkylene group having from 2 to 6 carbon atoms; $X^{23}$ represents a covalent bond, an oxygen atom or an alkylene glycol group; $E^{23}$ represents —NHCO— (provided that in this case, is a $X^{23}$. covalent bond) or a bivalent group derived from a diisocyanate selected from the group consisting of saturated aliphatic, alicyclic and aromatic diisocyanates (provided that in this case, $X^{23}$ is an oxygen atom or an alkylene glycol group), which forms a urethane bond together with $X^{23}$ and the adjacent oxygen atom bonded to $R^{41}$. The alkylene glycol group may, for example, be a group of the formula VII as described above.

With respect to $R^{41}$, if the carbon number of the trivalent hydrocarbon group is 7 or more, the oxygen permeability tends to be low. Taking into the production efficiency into consideration, the carbon number is preferably from 2 to 4, more preferably 3.

A representative example of $R^{41}$ may be a trivalent hydrocarbon group of the formula VIII:

(VIII)

wherein s is an integer of from 0 to 5, t is an integer of from 0 to 5, and u is an integer of from 0 to 5, provided that s+t+u is an integer of from 0 to 5.

Symbol m is an integer of from 1 to 1500, and n is an integer of from 0 to 1500–m. However, if m+n is larger than 1500, the molecular weight of the macromonomer (D) tends to be too large, and the compatibility with other copolymer components tends to be poor, whereby there will be troubles such that it does not adequately dissolve when mixed, white turbidity is likely to form during the polymerization, and it tends to be difficult to obtain a uniform and transparent soft ocular lens material. On the other hand, if m+n is too small, not only the oxygen permeability of the resulting soft ocular lens material tends to be low, but also the flexibility tends to be low. Therefore, m+n is usually an integer of from 1 to 1500, preferably from 2 to 500, more preferably from 5 to 100.

The macromonomer (D) is incorporated in an amount of from 3 to 40 parts by weight, preferably from 5 to 30 parts by weight, more preferably from 5 to 25 parts by weight, most preferably from 10 to 20 parts by weight, relative to 100 parts by weight of the total amount of the copolymer components. If the amount of the macromonomer (D) is less than the above lower limit, no adequate effects of using the macromonomer (D) tends to be obtained, and it tends to be difficult to impart elastic resiliency (toughness or strong elasticity) to the resulting soft ocular lens material, and the material tends to be brittle. Yet, in such a case, it becomes difficult to impart adequate mechanical strength. On the other hand, if the amount of the macromonomer (D) exceeds the above-mentioned upper limit, the amounts of other copolymer components decrease correspondingly, whereby not only the flexibility of the resulting soft ocular lens material tends to be poor, but also the compatibility with other copolymer components tends to be poor, and it becomes difficult to obtain a uniform and transparent soft ocular lens material.

It is preferred to employ a cross-linking agent to further improve the dimensional stability and durability such as chemical resistance, heat resistance and solvent resistance, of the soft ocular lens material of the present invention and to minimize eluting substances. In such a case, a macromonomer having at least two polymerizable groups in its molecule, may be used as a cross-linking agent.

Specific examples of such cross-linking agent include, for example, ethylene glycol di(meth)acrylate, diethylene glycol di(meth)acrylate, triethylene glycol di (meth)acrylate, propylene glycol di(meth)acrylate, dipropylene glycol di(meth)acrylate, allyl meth(acrylate), vinyl (meth)acrylate, trimethylolpropane tri(meth)acrylate, methacryloyloxyethyl acrylate, divinylbenzene, diallyl phthalate, diallyl adipate, triallyl isocyanurate, α-methylene-N-vinylpyrrolidone, 4-vinylbenzyl(meth)acrylate, 3-vinylbenzyl(meth)acrylate, 2,2-bis(p-(meth)acryloyloxyphenyl)hexafluoropropane, 2,2-bis(m-(meth)acryloyloxyphenyl)hexafluoropropane, 2,2-bis(o-(meth)acryloyloxyphenyl)hexafluoropropane, 2,2-bis(p-(meth)acryloyloxyphenyl)propane, 2,2-bis(m-(meth)acryloyloxyphenyl)propane, 2,2-bis(o-(meth)acryloyloxyphenyl)propane, 1,4-bis(2-(meth)acryloyloxyhexafluoroisopropyl)benzene, 1,3-bis(2-(meth)acryloyloxyhexafluoroisopropyl)benzene, 1,2-bis(2-(meth)acryloyloxyhexafluoroisopropyl)benzene, 1,4-bis(2-(meth)acryloyloxyisopropyl)benzene, 1,3-bis(2-(meth)acryloyloxyisopropyl)benzene, and 1,2-bis(2-(meth)acryloyloxyisopropyl)benzene. These cross-linking agents may be used alone or in combination as a mixture of two or more different types.

The above cross-linking agent may be incorporated usually in an amount of from 0.01 to 10 parts by weight, preferably from 0.05 to 8 parts by weight, more preferably from 0.1 to 5 parts by weight, relative to 100 parts by weight of the total amount of the copolymer components. If the amount of such a cross-linking agent is less than the above lower limit, no adequate effects of incorporating the cross-linking agent will be obtained. On the other hand, if the amount exceeds the above-mentioned upper limit, the resulting material tends to be brittle.

Further, for the purpose of adjusting the mechanical strength of the resulting material, a reinforcing monomer may further be incorporated to the above-mentioned essential copolymer components. Specific examples of such a reinforcing monomer include (meth)acrylic acid; styrenes such as styrene, methylstyrene and dimethylaminostyrene; aromatic ring-containing (meth)acrylates such as benzyl (meth)acrylate; and esters of unsaturated organic acids such as itaconic acid, crotonic acid, maleic acid and fumaric acid substituted by e.g. an alkyl group. These reinforcing monomers may be used alone or in combination as a mixture of two or more different types.

For the purpose of e.g. imparting a hydrophilic nature, a hydrophilic monomer may further be incorporated to the above-mentioned essential copolymer components. Specific examples of such a hydrophilic monomer include hydroxyl group-containing (meth)acrylates such as hydroxyethyl(meth)acrylate, hydroxypropyl(meth)acrylate, hydroxybutyl(meth)acrylate, dihydroxypropyl(meth)acrylate, dihydroxybutyl(meth)acrylate, diethylene glycol mono(meth)acrylate, triethylene glycol mono(meth)acrylate and dipropylene glycol mono(meth)acrylate; (meth)acrylic acid; vinyl lactams such as N-vinylpyrrolidone, α-methylene-N-methylpyrrolidone, N-vinylcaprolactam and N(meth)acryloylpyrrolidone; (meth)acrylamides such as (meth)acrylamide, N-methyl(meth)acrylamide, N-ethyl(meth)acrylamide, N-hydroxyethyl(meth)acrylamide, N,N-dimethyl(meth)acrylamide, N,N-diethyl(meth)acrylamide and N-ethylaminoethyl(meth)acrylamide; and aminoalkyl(meth)acrylates such as aminoethyl(meth)acrylate, N-methylaminoethyl(meth)acrylate and N,N-dimethylaminoethyl(meth)acrylate. These hydrophilic monomers may be used alone or in combination as a mixture of two or more different kinds.

For the purpose of supplementally improving the oxygen permeability, an oxygen permeability-imparting monomer may further be incorporated to the above-mentioned essential copolymer components. Specific examples of such a monomer include silicon-containing (meth)acrylates such as pentamethyldisiloxanylmethyl(meth)acrylate, pentamethyldisiloxanylpropyl(meth)acrylate, methylbis(trimethylsiloxy)silylpropyl(meth)acrylate, tris(trimethylsiloxy)silylpropyl(meth)acrylate, mono[methylbis(trimethylsiloxy)siloxy]bis-(trimethylsiloxy)silylpropyl(meth)acrylate, tris[methylbis(trimethylsiloxy)siloxy]silylpropyl(meth)acrylate, methylbis(trimethylsiloxy)silylpropylglyceryl(meth)acrylate, tris(trimethylsiloxy)silylpropylglyceryl(meth)acrylate, mono[methylbis(trimethylsiloxy)siloxy]bis(trimethylsiloxy)silylpropylglyceryl(meth)acrylate, trimethylsilylethyltetramethyldisiloxanylpropylglyceryl(meth)acrylate, trimethylsilylmethyl(meth)acrylate, trimethylsilylpropyl(meth)acrylate, trimethylsilylpropylglyceryl(meth)acrylate, pentamethyldisiloxanylpropylglyceryl(meth)acrylate, methylbis(trimethylsiloxy)silylethyltetramethyl-disiloxanylmethyl(meth)acrylate, tetramethyltriisopropylcyclotetrasiloxanylpropyl(meth)acrylate and tetramethyltriisopropylcyclotetrasiloxybis-(trimethylsiloxy)silylpropyl(meth)acrylate, fluorine or silicon-containing styrenes such as pentafluorostyrene, trimethylstyrene, trifluoromethylstyrene, (pentamethyl-3,3-bis(trimethylsiloxy)trisiloxanyl)styrene and (hexamethyl-3-trimethylsiloxytrisiloxanyl)styrene; and alkyl esters of itaconic acid, crotonic acid, maleic acid, fumaric acid, which may be substituted by a fluorine-containing alkyl group and/or a siloxanyl alkyl group. These monomers may be used alone or in combination as a mixture of two or more different types.

The amounts of the above-mentioned reinforcing monomer, hydrophilic monomer and oxygen-permeability-imparting monomer may be optionally suitably adjusted depending upon the particular use of the resulting material. However, the amounts may usually be preferably not more than 30 parts by weight, particularly not more than 20 parts by weight, relative to 100 parts by weight of the total amount of the copolymer components. If the amounts of these monomers exceed the above upper limit, the amounts of the above-mentioned essential copolymer components decrease correspondingly, whereby no adequate effects by such copolymer components tend to be obtained.

When the above-mentioned hydrophilic monomer is to be incorporated, the amount of such a hydrophilic monomer is preferably not more than 15 parts by weight relative to 100 parts by weight of the total amount of the copolymer components, so that the resulting soft ocular lens material may be made substantially non-water absorptive or less water absorptive. For example, when the soft ocular lens material of the present invention is used as a contact lens, such a material is preferably substantially non-water absorptive or of an extremely low water absorptivity. If such a material is substantially non-water absorptive, there will be no intrusion or propagation of microorganisms such as bacteria into the lens, whereby cumbersome lens care such as sterilization may not necessarily be periodically required, and the deterioration of the mechanical strength due to an increase of the water content can be minimized. Further, also in a case where the material is used as an intraocular lens, if it is substantially non-water absorptive, a deterioration in the mechanical strength due to an increase of the water absorption can be minimized, and the dimensional stability as the lens will not be impaired.

Further, for the purpose of imparting ultraviolet absorptivity to lenses, coloring the lenses or shutting out a part of light rays in the visible light wave length region, a polymerizable ultraviolet absorber, a polymerizable dyestuff or a polymerizable ultraviolet absorbing dyestuff may be incorporated to the above-mentioned copolymer components.

Specific examples of the polymerizable ultraviolet absorber include benzophenone type polymerizable ultraviolet absorbers such as 2-hydroxy-4-(meth)acryloyloxybenzophenone, 2-hydroxy-4 -(meth)acryloyloxy-5-tert-butylbenzophenone, 2-hydroxy-4 -(meth)acryloyloxy-2',4'- dichlorobenzophenone and 2 -hydroxy-4-(2'-hydroxy-3'-(meth)acryloyloxypropoxy)-benzophenone; benzotriazole type polymerizable ultraviolet absorbers such as 2-(2'-hydroxy-5' -(meth)acryloyloxyethylphenyl)-2H-benzotriazole; 2 -hydroxy-5'-(meth)acryloyloxyethylphenyl )-5-chloro-2H-benzotriazole, 2-(2'-hydroxy-5' -(meth)acryloyloxypropylphenyl)-2H-benzotriazole and 2 -2'-hydroxy-5'-(meth)acryloyloxypropyl-3'-tert-butylphenyl)-5-chloro-2H-benzotriazole; salicylic acid derivative-type polymerizable ultraviolet absorbers such as phenyl 2-hydroxy-4-(meth)acryloyloxymethylbenzoate; and other polymerizable ultraviolet absorbers such as methyl 2-cyano-3-phenyl-3-(3'-(meth)acryloyloxyphenyl)propenoate. These polymerizable ultraviolet absorbers may be used alone or in combination as a mixture of two or more different kinds.

Specific examples of the polymerizable dyestuff include azo type polymerizable dyestuffs such as 1 -phenylazo-4-(meth)acryloyioxynaphthalene, 1-phenylazo-2-hydroxy-3-(meth)acrylcyloxynaphthalene and 1-naphthylazo-2-hydroxy-3-(meth)acryloyloxynaphthalene; anthraquinone type polymerizable dyestuffs such as 1,5 -bis((meth)acryloylamino)-9,10-anthraquinone and 1-(4'-vinylbenzoylamide)-9,10-anthraquinone; nitro type polymerizable dyestuffs such as o-nitroanilinomethyl (meth)acrylate; and phthalocyanine type polymerizable dyestuffs such as (meth)acryloyl-modified tetraamino copper phthalocyanine and (meth)acryloyl-modified (dodecanoyl-modified tetraamino copper phthalocyanine). These polymerizable dyestuffs may be used alone or in combination as a mixture of two or more different kinds. Specific examples of the polymerizable ultraviolet absorbing dyestuff include benzophenone type polymerizable ultraviolet absorbing dyestuffs such as 2,4-dihydroxy-3-(p-styrenoazo)benzophenone, 2,4-dihydroxy-5-(p-styrenoazo)benzophenone and 2,4-dihydroxy-3-(p-(meth)acryloyloxymethylphenylazo)benzophenone; and benzoic acid type polymerizable ultraviolet absorbing dyestuffs such as phenyl 2-hydroxy-4-(p-styrenoazo)benzoate. These polymerizable ultraviolet absorbing dyestuffs may be used alone or in combination as a mixture of two or more different kinds.

The amounts of the above-mentioned polymerizable ultraviolet absorber, polymerizable dyestuff and polymerizable ultraviolet absorbing dyestuff vary depending on the thickness of he lens and can not be generally defined. However, they are preferably not more than 3 parts by weight, more preferably from 0.1 to 2 parts by weight, per 100 parts by weight of the total amount of the copolymer components. If the amount exceeds 3 parts by weight, the physical properties of the lens such as mechanical strength, tend to deteriorate. Further, in consideration of the toxicity of the ultraviolet absorber or dyestuff, such a material tends to be unsuitable as a material for ocular lenses such as contact lenses which are in direct contact with living tissues or intraocular lenses embedded in living bodies. Particularly in the case of a dyestuff, the amount is too large, the color of the lens tends to be so deep that the transparency decreases, and visible rays tend to be hardly transmitted through the lens.

Further, in the present invention, one or more members selected from a reinforcing monomer, a hydrophilic monomer, an oxygen permeability-imparting monomer, a polymerizable ultraviolet absorber, a polymerizable dyestuff and a polymerizable ultraviolet absorbing dyestuff, may be made into a macromonomer, and such a macromonomer may be incorporated.

However, in the present invention, an alkyl(meth)acrylate such as n-butyl acrylate should not be employed, because the effect of reducing tackiness tends to be low when the alkyl(meth)acrylate is contained.

The types and the amounts of the above-mentioned copolymer components are suitably adjusted depending upon the particular purpose of the desired ocular lens such as a contact lens or an intraocular lens.

The soft ocular lens material of the present invention may be prepared, for example, by a process which comprises mixing the monomer (A), the monomer (B), the macromonomer (C), the macromonomer (D)and optionally added other components, and adding a radical polymerization initiator thereto, followed by polymerization by a usual method.

The usual method may be a method of gradually heating the mixture after the addition of the radical polymerization initiator, at a temperature within a range of from room temperature to about 130° C., or a method of irradiating electromagnetic waves such as microwaves, ultraviolet rays or radiation rays (γ-rays). In the case of the heat polymerization, the temperature may stepwisely be raised. The polymerization may be conducted by a bulk polymerization method or a solvent polymerization method by means of a solvent, or it may be conducted by any other method.

Specific examples of the radical polymerization initiator include azobisisobutyronitrile, azobisdimethylvaleronitrile, benzoyl peroxide, tert-butyl hydroperoxide and cumene hydroperoxide. These radical polymerization initiators may be used alone or in combination as a mixture of two or more different kinds. In a case where photopolymerization is employed, a photopolymerization initiator or sensitizer is preferably added. The above-mentioned polymerization initiator or sensitizer is incorporated usually in an amount of from about 0.001 to 2 parts by weight, preferably from 0.01 to 1 part by weight, per 100 parts by weight of the total amount of the copolymer components.

For the shaping of ocular lenses such as contact lenses or intraocular lenses, shaping methods commonly used by those skilled in the art may be employed. As such shaping methods, there may be mentioned, for example, a cutting and grinding method and a molding method. The cutting and grinding method is a method in which the polymerization is conducted in a suitable mold or vessel to obtain a rod-, block- or plate-shaped base material (polymer), and then the base material is processed into a desired shape by mechanical processing such as cutting, grinding and polishing. The molding method is a method wherein a mold corresponding to the shape of a desired ocular lens is prepared, and the polymerization of the copolymer components is conducted in this mold to obtain a molded product, which may further be subjected to mechanical finishing treatment, if necessary.

The soft ocular lens material of the present invention is a soft material at a temperature around room temperature.

Therefore, for shaping an ocular lens, a molding method is generally suitable as the shaping method. As the molding method, a spin casting method or a static casting method is known.

To obtain an intraocular lens, a supporting portion of the lens may be prepared separately from the lens and then attached to the lens, or it may be molded simultaneously (integrally) with the lens.

Further, for the preparation of a soft material of the present invention, it is also possible to employ a method wherein a monomer for a hard polymer is impregnated to a soft material as disclosed, for example, in Japanese Examined Patent Publication No. 11541/1993, followed by polymerization to harden the material, which is then mechanically processed into a desired shape, whereupon the hard polymer is removed by a solvent to obtain a soft shaped product.

In the present invention, various surface treatments may be applied after shaping the soft ocular lens material into a desired ocular lens shape.

The ocular lens material of the present invention thus obtained, has many excellent properties such that it is (a) soft, whereby when made into a contact lens, it provides a comfortable feeling to the wearer, and when made into an intraocular lens, it will not damage the ocular tissues and can readily be inserted in a deformed shape through a small incision, and (b) substantially non-water absorptive or of a low water absorptivity, whereby it is free from a deterioration of the mechanical strength due to an increase of the water content and free from a deterioration of the dimensional stability as a lens, and bacteria will hardly propagate in the material, whereby when made into contact lenses, cumbersome treatment such as boiling for sterilization, may be omitted, and (c) excellent in the oxygen permeability, whereby when made into a contact lens, it does not impair the metabolic function of the cornea, and (d) excellent in the mechanical strength, whereby the dimension as a lens is stable, and it is unbreakable against various physical treatments, and (e) hardly stained with e.g. lipid stains, whereby it is free from turbidity of lenses due to such stains and it is free from adversely affecting the ocular tissues, and (f) excellent in the surface hydrophilic nature and free from surface tackiness, whereby a trouble such as adhesion to the ocular tissues will scarcely occur.

Now, the soft ocular lens material of the present invention will be described in further detail with reference to Examples. However, it should be understood that the present invention is by no means restricted to such specific Examples.

EXAMPLE 1

Preparation of ocular lens material

A gasket made of a fluorine resin was sandwiched by polyester films from both sides and further sandwiched by glass plates placed thereover to obtain a mold.

25 Parts by weight of 2,2,2,2',2',2'-hexafluoroisopropyl acrylate, 50 parts by weight of methoxyethyl acrylate, 20 parts by weight of the macromonomer (C) of the formula IX:

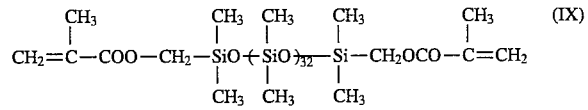

5 parts by weight of the macromonomer (D) of the formula (X):

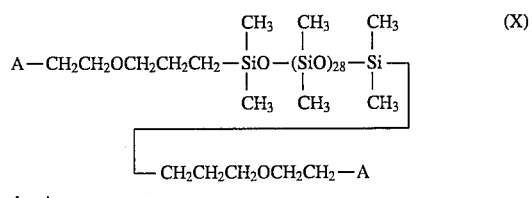

wherein A represents:

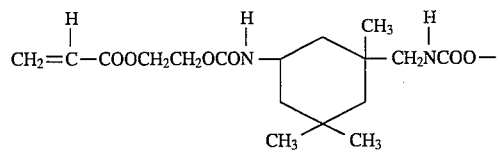

and 0.5 part by weight of ethylene glycol dimethacrylate, were uniformly blended, and 0.3 part by weight of azobis-dimethylvaleronitrile was added thereto to obtain a blend solution. The blend solution was injected to the above mold.

The mold was transferred to an air circulating dryer, and the blend solution was polymerized at 50° C. for 12 hours and then the temperature was raised at a rate of 10° C. per 2 hours to 110° C., to obtain a copolymer in a film form.

The obtained copolymer was folded back and then released, whereupon it immediately returned to the initial state, thus indicating excellent resiliency. Thus, this copolymer was ascertained to have flexibility suitable as a soft ocular lens material. Further, a test specimen in water was visually observed, whereby the outer appearance was transparent and faultless.

Then, test specimens having a diameter of 14 mm were punched out of the copolymer film, and the strength against penetration, the oxygen permeation coefficient, the water absorptivity, the contact angle, the apparent wettability with water, the tackiness and the stickiness were measured by the following methods. The results are shown in Table 1.

Strength against penetration (a) Penetration resistance

By means of an Instron type compression tester, a pressing needle having a diameter of 1/16 inch was pressed against the center of a test specimen, and the load (g) at the time of the breakage of the test specimen, was measured. However, the values listed in the Table are values calculated as the thickness of the test specimen was 0.2 mm.

(b) Elongation

The elongation (%) at the time of the breakage of the test specimen in the above-mentioned measurement of the penetration resistance (g), was measured.

Oxygen permeation coefficient

The oxygen permeation coefficient of a test specimen was measured by means of a gas permeation measuring instrument Model GTR-10 manufactured by Yanagimoto Seisakusho Kabushiki Kaisha. As the test specimen, a disk-shaped specimen having a diameter of 14 mm and a thickness of 0.5 mm was used. The measurement was carried out at 35° C. The unit for the oxygen permeation coefficient is $$\frac{ml\,(STP)\cdot cm^2}{cm^3\cdot sec\cdot mmHg}.$$

The oxygen permeation coefficients in the Tables 1 and 2 are numerical values obtained by multiplying the values of the oxygen permeation coefficients by $10^{11}$.

Water absorptivity

After extracting remaining monomers from a test specimen by reflux extraction by means of hexane, the water absorptivity of the test specimen was measured in accordance with the following equation:

$$\text{Water absorptivity (\%)} = \frac{W - W_0}{W_0} \times 100$$

where W is the weight (g) of the test specimen upon absorption of water to the equilibrium state, and Wo is the weight (g) of the test specimen in a dried state.

Contact angle

The contact angle was measured by a liquid drop method at room temperature by means of a contact angle tester CA-A manufactured by Kyowa Kaimenkagaku K.K.

Apparent wetness with water

A disc-shaped test specimen having a diameter of 14 mm and a thickness of 0.25 mm was pinched by a pincette, immersed in distilled water and then withdrawn from the distilled water. At that time, the wettability with water of the surface of the test piece was visually observed and evaluated on the basis of the following standards.

Evaluation standards

A: The entire surface of the test piece was uniformly wetted with water.

B: The entire surface of the test piece was not uniformly wetted with water, and the surface was wetted only partially.

C: The entire surface of the test piece repelled water, and no deposition of water was observed.

Tackiness

The surface of a disc-shaped test piece having a diameter of 14 mm and a thickness of 0.25 mm was touched by a finger tip, whereby the feeling was checked and evaluated on the basis of the following evaluation standards.

Evaluation standards

A: No tackiness felt.

B: No substantial tackiness felt as compared with the material of Comparative Example 1.

C: Tackiness of the same level as the material of Comparative Example 1 felt.

D: Substantial tackiness felt as compared with the material of Comparative Example 1.

Stickiness

A test specimen having a thickness of 0.25 mm, a width of 8.0 mm and a length of 25 mm was put on a polyester film of the same shape, and they were sandwiched by a pair of glass sheets and pressed together for 30 seconds by means of a weight of 100 g. A peeling test of the laminated films was conducted by means of an Instron tensile tester. The force required for peeling at a pulling speed of 0.5 cm/min was taken as an index of the stickiness (unit: g).

EXAMPLES 2 to 6

In the same manner as in Example 1, various components were mixed to bring the composition as shown in Table 1 and polymerized to obtain a copolymer in a film form, which was processed to obtain test specimens. Then, with respect to the test specimens, various physical properties were measured in the same manner as in Example 1. The results are also shown in Table 1.

The obtained copolymer was folded back and then released, whereupon it immediately returned to the initial state, thus indicating excellent resiliency. Thus, this copolymer was ascertained to have flexibility suitable as a soft ocular lens material. Further, a test specimen in water was visually observed, whereby the outer appearance was transparent and faultless.

In Tables 1 and 2, various abbreviations have the following meanings:

6FA: 2,2,2,2',2',2'-Hexafluoroisopropyl acrylate
MEA: Methoxyethyl acrylate
EDEA: Ethoxydiethylene glycol acrylate
AA: Acrylic acid
BuA: Butyl acrylate
EDMA: Ethylene glycol dimethacrylate
V-65: Azobisdimethylvaleronitrile The proportions of the blend components in the Tables are all represented by parts by weight.

TABLE 1

| Example Nos. | 1 | 2 | 3 | 4 | 5 | 6 |
| --- | --- | --- | --- | --- | --- | --- |
| Blend components (parts) | | | | | | |
| Monomer (A) | 6FA | 6FA | 6FA | 6FA | 6FA | 6FA |
|  | 25 | 32 | 47 | 30 | 40 | 50 |
| Monomer (B) | MEA | MEA | MEA | EDEA | EDEA | EDEA |
|  | 50 | 43 | 28 | 45 | 35 | 25 |
| Macromonomer (C) | 20 | 15 | 19 | 20 | 20 | 20 |
| Macromonomer (D) | 5 | 10 | 6 | 5 | 5 | 5 |
| Crosslinking agent | EDMA | EDMA | EDMA | EDMA | EDMA | EDMA |
|  | 0.5 | 0.5 | 0.5 | 0.5 | 0.5 | 0.5 |
| Polymerization initiator | V-65 | V-65 | V-65 | V-65 | V-65 | V-65 |
|  | 0.3 | 0.3 | 0.3 | 0.3 | 0.3 | 0.3 |
| Physical properties | | | | | | |
| Penetration strength | | | | | | |
| Penetration resistance (%) | 157 | 208 | 208 | 134 | 148 | 170 |
| Elongation (%) | 40 | 52 | 50 | 26 | 30 | 34 |
| Oxygen permeation coefficient | 114 | 107 | 124 | 136 | 144 | 148 |
| Water absorptivity (%) | 0.94 | 0.68 | 0.51 | 1.04 | 0.55 | 0.57 |
| Contact angle (°) Liquid drop | 94 | 93 | 96 | 83 | 85 | 98 |
| Apparent wettability with water | A | A | A | A | A | A |
| Tackiness | B | B | B | A | A | A |

TABLE 1-continued

| Example Nos. | 1 | 2 | 3 | 4 | 5 | 6 |
|---|---|---|---|---|---|---|
| Stickiness (g) | 0.70 | 0.38 | 0.38 | 0.22 | 0.34 | 0.54 |

Comparative Examples 1 to 4

In the same manner as in Example 1, various components were blended to form a composition as identified in Table 2, followed by polymerization. From the obtained copolymer, a flexible transparent film-shaped test specimen of 1.5 cm×7 cm having a thickness of 0.3 mm, was obtained. Then, with respect to the obtained test specimen, various physical properties were measured in the same manner as in Example 1. The results are shown in Table 2.

TABLE 2

| Comparative Example Nos. | 1 | 2 | 3 | 4 |
|---|---|---|---|---|
| Blend components (parts) | | | | |
| Monomer (A) | 6FA | 6FA | 6FA | 6FA |
|  | 50 | 40 | 40 | 40 |
| Monomer (B) | — | — | MEA | EDEA |
|  |  |  | 5 | 5 |
| Macromonomer (C) | 10 | 10 | 10 | 10 |
| Macromonomer (D) | 10 | 15 | 15 | 15 |
| Other copolymer components | BuA | BuA | BuA | BuA |
|  | 25 | 30 | 30 | 30 |
|  |  | AA |  |  |
|  |  | 5 |  |  |
| Crosslinking agent | EDMA | EDMA | EDMA | EDMA |
|  | 0.5 | 0.5 | 0.5 | 0.5 |
| Polymerization initiator | V-65 | V-65 | V-65 | V-65 |
|  | 0.3 | 0.3 | 0.3 | 0.3 |
| Physical properties | | | | |
| Water absorptivity (%) | 0.22 | 0.91 | 0.08 | 0.28 |
| Contact angle (°) Liquid drop | 102 | 94 | 97 | 99 |
| Apparent wettability with water | B (standard) | B | B | B |
| Tackiness | C (standard) | C | C | C |
| Stickiness (g) | 2.71 | 2.02 | 1.32 | 0.74 |

As is evident from the results shown in Tables 1 and 2, the tackiness and the stickiness of the surface of the soft contact lens material of the present invention, are substantially reduced.

From the foregoing, it is evident that the ocular lens material of the present invention is hardly stained with lipids, by virtue of the effects of the monomer (A). Further, by virtue of synergistic effects of the combined use of macromonomers (C) and (D), the mechanical strength is sufficiently reinforced and improved over the conventional non-water absorptive soft contact lens materials, and the oxygen permeability is also remarkably improved.

Further, it is evident that by the use of the monomer (B), the surface hydrophilicity and reduction of tackiness, which are desired for an ocular lens, are further improved.

Further, as is evident from Comparative Examples 3 and 4, the effect for reducing tackiness tends to disappear when an alkyl(meth)acrylate such as butyl acrylate is contained.

The soft ocular lens material of the present invention is soft and substantially non-water absorptive or of a low water absorptivity. Stains such as lipids scarcely adhere thereto, and the material is free from tackiness on its surface. It has high oxygen permeability and is excellent in the mechanical strength. Yet, it is a transparent ocular lens material having an improved surface hydrophilicity.

Since the soft ocular lens material of the present invention is soft, it is suitable for use as a soft contact lens material which presents a comfortable feeling to the wearer, or as an intraocular lens material which can readily be inserted in a deformed shape through a small incision without damaging the ocular tissues.

Further, since the soft ocular lens material of the present invention is substantially non-water absorptive or of a low water absorptivity, it is free from a deterioration of the mechanical strength due to an increase of the water content and free from a deterioration of the dimensional stability required for a lens. Further, bacteria and the like hardly propagate in the material, and when used as a contact lens, it is free from cumbersome treatment such as boiling for sterilization.

Furthermore, since the soft ocular lens material of the present invention is excellent in the oxygen permeability, it does not impair the metabolic function of the cornea when it is used as a contact lens.

Still further, since the soft ocular lens material of the present invention has excellent mechanical strength, and it is thereby possible to obtain a lens having an excellent dimensional stability, which is durable against various physical treatments.

Moreover, since stains such as lipids scarcely adhere to the soft ocular contact lens material of the present invention, the material is free from turbidity of lens due to the stains. Further, the surface hydrophilicity is improved, and it is free from surface tackiness, whereby a trouble such as adhesion to the living tissues such as cornea scarcely occurs. Accordingly, it is easy to handle without damaging the ocular tissues, and foreign matters scarcely adhere to the surface.

Accordingly, the soft ocular lens material of the present invention is suitable for use as various ocular lenses such as contact lenses and intraocular lenses.

We claim:

1. A soft ocular lens material prepared by copolymerizing copolymer components consisting essentially of:

(A) from 5 to 70 parts by weight of a fluorine-containing (meth)acrylate;

(B) from 5 to 60 parts by weight of an alkoxy-containing (meth)acrylate;

(C) from 3 to 45 parts by weight of a polysiloxane macromonomer having polymerizable groups at both terminals, of the formula (I):

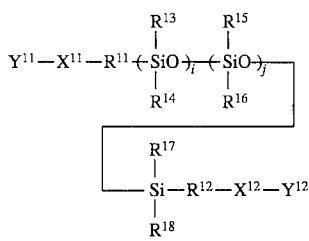
(I)

wherein each of $Y^{11}$ and $Y^{12}$ independently represents an acryloyl group, a methacryloyl group, a vinyl group or an allyl group; each of $X^{11}$ and $X^{12}$ independently represents a covalent bond, an oxygen atom or an alkylene glycol group; each of $R^{11}$ and $R^{12}$ independently represents a linear or branched alkylene group having from 1 to 6 carbon atoms; each of $R^{13}$, $R^{14}$, $R^{15}$, $R^{16}$, $R^{17}$ and $R^{18}$ independently represents an alkyl group having from 1 to 3 carbon atoms or a phenyl group; i is an integer of from 1 to 1500; and j is an integer of from 0 to 1500–i; and (D) from 3 to 40 parts by weight of a polysiloxane macromoner having polymerizable groups bonded via one or two urethane bonds to the siloxane main chain, of the formula (II):

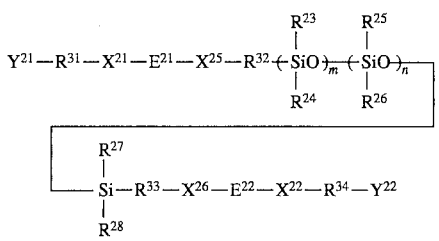
(II)

wherein each of $Y^{21}$ and $Y^{22}$ independently represents a group selected from the group consisting of an acryloyloxy group, a methacryloyloxy group, a vinyl group and an allyl group; each of $R^{31}$ and $R^{34}$ independently represents a linear or branched alkylene group having from 2 to 6 carbon atoms; each of $X^{21}$ and $X^{22}$ independently represents a covalent bond, an oxygen atom or an alkylene glycol group; each of $R^{32}$ and $R^{33}$ independently represents a linear or branched alkylene group having from 1 to 6 carbon atoms; each of $R^{23}$, $R^{24}$, $R^{25}$, $R^{26}$, $R^{27}$ and $R^{28}$ independently represent an alkyl group having from 1 to 3 carbon atoms or a phenyl group; each of $E^{21}$ and $E^{22}$ independently represents —NHCO—, provided that in this case, each of $X^{21}$ and $X^{22}$ is a covalent bond, $E^{21}$ forms a urethane bond together with $X^{25}$, and $E^{22}$ forms bond together with $X^{26}$, or a bivalent group derived from a diisocyanate selected from the group consisting of saturated aliphatic, alicyclic and aromatic diisocyanates, provided that in this case, each of $X^{21}$ and $X^{22}$ independently represents an oxygen atom or an alkylene glycol group, $E^{21}$ forms a urethane bond together with $X^{21}$ and $X^{25}$, and $E^{22}$ forms a urethane bond together with $X^{22}$ and $X^{26}$; each of $X^{25}$ and $X^{26}$ independently represents an oxygen atom, an alkylene glycol group or a group represented by the formula (III):

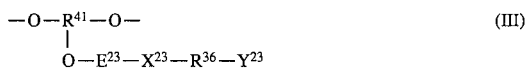
(III)

wherein $R^{41}$ is a trivalent hydrocarbon group having from 1 to 6 carbon atoms; $Y^{23}$ represents a group selected from the group consisting of an acryloyloxy group, a methacryloyloxy group, a vinyl group and an alkyl group; $R^{36}$ represents a linear or branched alkylene group having from 2 to 6 carbon atoms; $X^{23}$ represents a covalent bond, an oxygen atom or an alkylene glycol group; $E^{23}$ represents —NHCO—, provided that in this case, $X^{23}$ is a covalent bond or a bivalent group derived from a diisocyanate selected from the group consisting of saturated aliphatic, alicyclic and aromatic diisocyanates, provided that in this case, $X^{23}$ an oxygen atom or an alkylene glycol group, which forms a urethane bond together with $X^{23}$ and the adjacent oxygen atom bonded to $R^{41}$; m is an integer of from 1 to 1500; and n is an integer of from 0 to 1500–m;

and further with the proviso that said copolymerizing copolymer components do not contain alkyl-(meth)acrylate.

2. The soft ocular lens material according to claim 1, wherein said copolymer components further comprise from 0.01 to 10 parts by weight of a cross-linking agent.

3. The soft ocular lens material according to claim 1, wherein the copolymer components further contain at least one member selected from the group consisting of not more than 30 parts of a reinforcing monomer, not more than 30 parts by weight of hydrophilic monomer, not more than 30 parts by weight of an oxygen-permeability-imparting monomer, not more than 3 parts by weight of polymerizable ultraviolet absorber, not more than 3 parts by weight of polymerizable dyestuff, and not more than 3 parts by weight of polymerizable ultraviolet adsorbing dyestuff.

4. The soft ocular lens material according to claim 1, wherein the fluorine-containing (meth)acrylate (A) is represented by the formula (IV):

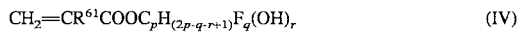
(IV)

wherein $R^{61}$ represents a hydrogen atom or a methyl group, p is an integer of from 1 to 15, q is an integer of from 1 to (2p+1) and r is an integer of from 0 to 2.

5. The soft ocular lens material according to claim 1, wherein the alkoxy-containing(meth)acrylate (B) is a monomer of the formula (V):

(V)

wherein $R^{51}$ is a hydrogen atom or a methyl group, $R^{52}$ is a hydrocarbon group having from 1 to 12 carbon atoms, and v is an integer of from 1 to 12, or a monomer of the formula (VI):

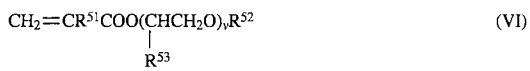
(VI)

wherein $R^{51}$, $R^{52}$ and v are as defined above, and $R^{53}$ is a hydrogen atom or a methyl group.

6. The soft ocular lens material according to claim 1, wherein the alkoxy-containing (meth)acrylate (B) is at least one member selected from the group consisting of methoxyethyl(meth)acrylate, ethoxyethyl(meth)acrylate, butoxyethyl(meth)acrylate, methoxypropyl(meth)acrylate, methoxybutyl(meth)acrylate, methoxydiethylene glycol(meth)acrylate and ethoxydiethylene glycol-(meth)acrylate.

7. The soft ocular lens material according to claim 1, wherein the (meth)acrylate (B) is an alkoxy-containing (meth)acrylate, of which the glass transition temperature of a homopolymer is not higher than 40° C.

8. The soft ocular lens material according to claim 1, wherein the alkylene glycol group for each of $X^{11}$, $X^{12}$, $X^{21}$, $X^{22}$, $X^{23}$, $X^{25}$ and $X^{26}$ is a group of the formula (VII):

$$-O+C_kH_{2k}-O)_{\overline{l}} \qquad (VII)$$

wherein k is an integer of from 2 to 4, and l is an integer of from 1 to 5.

9. The soft ocular lens material according to claim 1, wherein $R^{41}$ in the formula (III) is a trivalent hydrocarbon group of the formula (VIII):

$$+CH_2)_{\overline{s}}CH+CH_2)_{\overline{t}} \qquad (VIII)$$
$$\phantom{+CH_2)_{\overline{s}}}(CH_2)_u$$

wherein s is an integer of from 0 to 5, t is an integer of from 0 to 5, and u is an integer of from 0 to 5, provided that s+t+u is an integer of from 0 to 5.

10. The soft ocular lens material according to claim 1, wherein said component (A) is used in an amount of 10 to 60 parts by weight.

11. The soft ocular lens material according to claim 1, wherein said component (A) is used in an amount of 25 to 55 parts by weight.

12. The soft ocular lens material according to claim 1, wherein said component (B) is used in an amount of 10 to 55 parts by weight.

13. The soft ocular lens material according to claim 12, wherein said component (B) is used in an amount of 20 to 50 parts by weight.

14. The soft ocular lens material according to claim 1, wherein said component (C) is used in an amount of 5 to 35 parts by weight.

15. The soft ocular lens material according to claim 14, wherein said component (C) is used in an amount of 10 to 20 parts by weight.

16. The soft ocular lens material according to claim 1, wherein for component (D), m+n is from 2 to 500.

17. The soft ocular lens material according to claim 16, wherein m+n is from 5 to 100.

18. The soft ocular lens material according to claim 1, wherein said component (D) is used in an amount of 5 to 30 parts by weight.

19. The soft ocular lens material according to claim 18, wherein said component (D) is used in an amount of 10 to 20 parts by weight.

* * * * *